(12) United States Patent
Won et al.

(10) Patent No.: US 11,039,000 B2
(45) Date of Patent: Jun. 15, 2021

(54) USER TERMINAL DEVICE AND CONTROL METHOD THEREFOR

(71) Applicant: Samsung Electronics Co., Ltd., Suwon-si (KR)

(72) Inventors: Seol-hye Won, Seoul (KR); Jin Ra, Suwon-si (KR); Seok-min Oh, Seongnam-si (KR); Kang-min Lee, Hwaseong-si (KR); Chul-ho Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 15/778,862

(22) PCT Filed: Sep. 27, 2016

(86) PCT No.: PCT/KR2016/010794
§ 371 (c)(1),
(2) Date: May 24, 2018

(87) PCT Pub. No.: WO2017/099338
PCT Pub. Date: Jun. 15, 2017

(65) Prior Publication Data
US 2018/0352067 A1    Dec. 6, 2018

(30) Foreign Application Priority Data

Dec. 8, 2015  (KR) .......................... 10-2015-0174109
Sep. 22, 2016 (KR) .......................... 10-2016-0121375

(51) Int. Cl.
*H04M 1/72433*    (2021.01)
*G06F 3/0481*    (2013.01)
(Continued)

(52) U.S. Cl.
CPC ....... *H04M 1/72433* (2021.01); *G06F 3/0488* (2013.01); *G06F 3/04817* (2013.01); *G10L 15/00* (2013.01)

(58) Field of Classification Search
CPC ..... H04L 12/1822; H04M 3/56; H04M 3/567; H04M 3/568; H04M 1/72433;
(Continued)

(56) References Cited

U.S. PATENT DOCUMENTS 5,309,517 A * 5/1994 Barclay .................. H04H 60/04
                                                        381/119
6,295,284 B1    9/2001 Maggenti
(Continued)

FOREIGN PATENT DOCUMENTS

EP    1 638 354 B1    11/2011
JP    2010-522508 A    7/2010
(Continued)

*Primary Examiner* — Lisa Hashem
(74) *Attorney, Agent, or Firm* — Jefferson IP Law, LLP

(57) ABSTRACT

Disclosed are a user terminal apparatus and a control method therefor. According to the present invention, a user terminal apparatus comprises: a communication unit for performing data communication with a plurality of other user terminal devices which are set as a group; a controller for determining an output order of voice messages corresponding to user voices according to a predetermined condition, when the user voices are received from a plurality of other user terminal apparatus; and an output unit for outputting voice messages in a determined output order. Accordingly, the user terminal apparatus can provide a service that enables easy group community with a plurality of other user apparatus.

17 Claims, 14 Drawing Sheets

(51) Int. Cl.
*G10L 15/00* (2013.01)
*G06F 3/0488* (2013.01)

(58) Field of Classification Search
CPC ............ H04M 2201/42; G06F 3/04817; G06F 3/0488; G06F 3/016; G10L 15/00
See application file for complete search history.

(56) References Cited

U.S. PATENT DOCUMENTS

| | | | | |
|---|---|---|---|---|
| 6,757,531 | B1* | 6/2004 | Haaramo | H04M 3/42382 340/7.1 |
| 7,478,129 | B1* | 1/2009 | Chemtob | H04L 12/1827 709/204 |
| 7,532,607 | B1* | 5/2009 | Eslambolchi | H04W 4/08 370/338 |
| 8,335,532 | B2 | 12/2012 | Lindner | |
| 8,676,243 | B2 | 3/2014 | Blanco | |
| 2004/0001090 | A1 | 1/2004 | Brown et al. | |
| 2006/0046762 | A1 | 3/2006 | Yoon et al. | |
| 2006/0215584 | A1* | 9/2006 | Yoshida | H04Q 3/62 370/260 |
| 2007/0239885 | A1* | 10/2007 | Vadlakonda | H04L 12/1827 709/232 |
| 2009/0220064 | A1* | 9/2009 | Gorti | H04M 3/56 379/202.01 |
| 2010/0020745 | A1* | 1/2010 | Agulnik | H04L 12/189 370/328 |
| 2011/0004650 | A1* | 1/2011 | Poussiere | G06F 16/958 709/202 |
| 2015/0089674 | A1 | 3/2015 | Clapham | |
| 2015/0304493 | A1* | 10/2015 | Deluca | H04M 1/724 379/207.04 |
| 2015/0341498 | A1* | 11/2015 | Dickins | H04M 3/2227 370/260 |
| 2016/0094475 | A1* | 3/2016 | Lynch | H04L 47/19 348/14.12 |
| 2016/0381720 | A1* | 12/2016 | Baek | H04W 76/12 370/329 |
| 2017/0086033 | A1* | 3/2017 | Kesson | H04W 4/08 |
| 2017/0245122 | A1* | 8/2017 | Yasuda | H04M 11/00 |
| 2017/0324788 | A1* | 11/2017 | Yoon | H04L 65/403 |
| 2018/0176384 | A1* | 6/2018 | Waugh | H04M 3/566 |
| 2021/0021318 | A1* | 1/2021 | Li | H04L 5/0023 |

FOREIGN PATENT DOCUMENTS

| | | |
|---|---|---|
| KR | 10-2005-0015638 A | 2/2005 |
| KR | 10-0890060 B1 | 3/2009 |
| KR | 10-2012-0035190 A | 4/2012 |
| KR | 10-2014-0089225 A | 7/2014 |
| KR | 10-2015-0124644 A | 11/2015 |
| WO | 2008/116047 A1 | 9/2008 |
| WO | 2010/148349 A1 | 12/2010 |

\* cited by examiner (a)          (b)

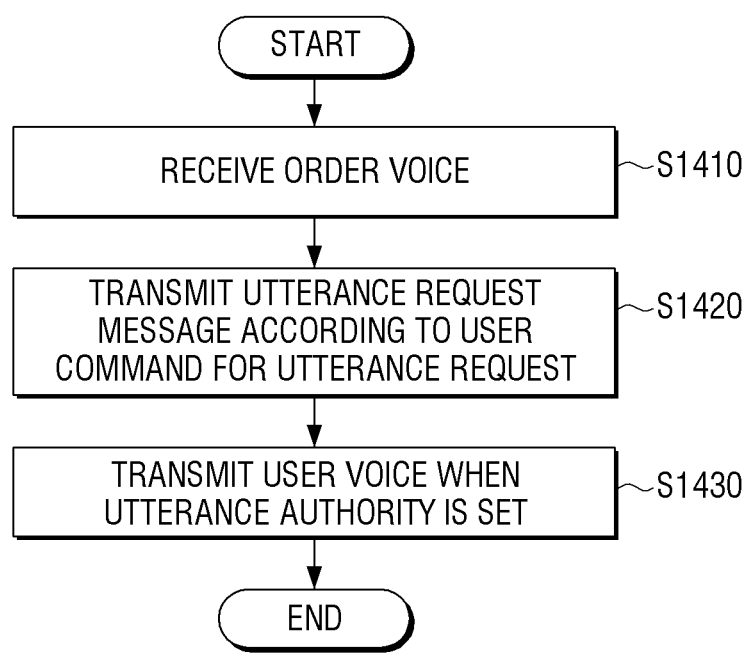

USER TERMINAL DEVICE AND CONTROL METHOD THEREFOR

TECHNICAL FIELD

The present disclosure relates to a user terminal apparatus and a controlling method thereof, and more particularly to a user terminal apparatus capable of performing a group communication, and a controlling method thereof.

BACKGROUND ART

Generally, a manager who manages a building such as a hotel orders business or requests a present status to a person in charge of each section of corresponding building using a communication apparatus such as a wireless set.

Accordingly, a person in charge of each section may make a business report according to the order of the manager using a possessing communication apparatus.

However, in a case in which a communication between a manager and a plurality of people in charge is performed by using such communication apparatus, a frequency channel should not be used between the communication apparatuses. That is, if a communication related to a business is being processed between a manager and a person in charge A by using a communication apparatus, a person in charge B could not perform a communication related to a business until the communication between the manager and the person in charge A is finished.

In addition, since it is difficult to confirm whether the communication related to the business between the manager and the person in charge A is finished, if a communication related to a business between the manager and the person in charge C starts after the communication between the manager and the person in charge A is finished, the person in charge B could not perform a communication related to a business consistently.

As such, since it is impossible to confirm whether the communication related to a business performed between a manager and a person in charge is finished by using a communication apparatus, a business report may not be performed quickly when an urgent situation occurs.

DETAILED DESCRIPTION OF INVENTION

Technical Problem

The present disclosure has been made to solve the above problem and to respond to the above described technology development request, and provided for ease of performing a communication for each group.

Further, the embodiment is provided so that a communication for each group is performed easily by using a user terminal apparatus without using an additional communication apparatus such as a wireless set used for a business-related communication between employees in a building.

Means of Solving the Problem

According to an embodiment, there is provided a communicator configured to perform data communication with a plurality of other user terminal apparatuses set as a group, a controller configured to, in response to a user voice being received from the plurality of other user terminal apparatuses, determine an output order of a voice message corresponding to the user voice according to a predetermined condition, and an output unit configured to output the voice message in the determined output order.

The controller, in response to a user voice being received from the plurality of other user terminal apparatuses, may determine an output order of a voice message corresponding to the user voice based on an order of receipt of the user voice.

The controller may determine an output order of a voice message corresponding to a user voice received from the plurality of other user terminal apparatuses based on an order that an utterance request message is received from the plurality of other user terminal apparatuses.

The controller may analyze similarity of a voice message corresponding to a user voice received from the plurality of other user terminal apparatuses, and determine an output order in an order of a voice message of which similarity is different.

The output unit may comprise a display unit and an audio output unit, and the controller may control the display unit to display an output UI which includes an execution icon regarding the voice message, and in response to a selection command on an execution icon included in the output UI being input, control at least one of the display unit and the audio output unit to output a voice message corresponding to the selection command.

The output unit may comprise a display unit which displays a channel list UI for each group, and the controller, in response to one of objects for each group included in the channel list UI being selected, may select a group corresponding to the selected object as a conversation partner group and transmit an order voice to a plurality of user terminal apparatuses included in the conversation partner group.

The controller may control the display unit to display reception status information on a user voice received from other user terminal apparatuses for each group on an object of each group included in the channel list UI.

The controller, when an order voice is received from a first user terminal apparatus among the plurality of other user terminal apparatuses, may transmit an utterance request message to the first user terminal apparatus according to a request of a user for an utterance request, and in response to an utterance authority being set from the first user terminal apparatus, may transmit a user voice with regard to the order voice to the first user terminal apparatus.

The controller, in response to an informing message according to the utterance authority being received, may provide a service informing of utterance possible status with regard to the order voice based on at least one of a vibration feedback and an event notification feedback.

According to another embodiment, a controlling method of a user terminal apparatus includes receiving a user voice from a plurality of other user terminal apparatuses set as a group, determining an output order of a voice message corresponding to the user voice according to a predetermined condition, and outputting the voice message in the determined output order.

The determining may comprise, in response to a user voice being received from the plurality of other user terminal apparatuses, determining an output order of a voice message corresponding to the user voice based on an order of receipt of the user voice.

The determining may comprise determining an output order of a voice message corresponding to a user voice received from the plurality of other user terminal apparatuses based on an order that an utterance request message is received from the plurality of other user terminal apparatuses.

The determining may comprise analyzing similarity of a voice message corresponding to a user voice received from the plurality of other user terminal apparatuses, and determining an output order in an order of a voice message of which similarity is different.

The outputting may comprise displaying an output UI which includes an execution icon regarding the voice message and in response to a selection command on an execution icon included in the output UI, outputting a voice message corresponding to the selection command as at least one of a text and an audio signal.

The controlling method may further include displaying a channel list UI for each group, in response to one of an object for each group included in the channel list UI being selected, setting a group corresponding to the selected object as a conversation partner group, and transmitting an order voice to a plurality of other user terminal apparatuses included in the conversation partner group.

The displaying may comprise displaying reception status information on a user voice received from other user terminal apparatuses for each group on an object of each group included in the channel list UI.

The controlling method may further include receiving an order voice from a first user terminal apparatus among the plurality of other user terminal apparatuses, transmitting an utterance request message to the first user terminal apparatus according to a request of a user for an utterance request, and in response to an utterance authority being set from the first user terminal apparatus, transmitting a user voice with regard to the order voice to the first user terminal apparatus.

The transmitting the user voice comprises, in response to an informing message according to the utterance authority being received, providing a service informing of utterance possible status with regard to the order voice based on at least one of a vibration feedback and an event notification feedback.

Effect of the Invention

According to various embodiments, a user terminal apparatus may provide a service in which a group communication with a plurality of other user apparatuses is performed easily.

BRIEF DESCRIPTION OF THE DRAWINGS

FIG. 14 is a flow chart illustrating a method that in a user terminal apparatus, the same group as the user terminal apparatus transmits a user voice to another user terminal apparatus according to an embodiment.

DESCRIPTION OF PREFERRED EMBODIMENT

Description of Embodiment

The present disclosure may have several embodiments, and the embodiments may be modified variously. In the following description, specific embodiments are provided with accompanying drawings and detailed descriptions thereof. However, this does not necessarily limit the scope of the exemplary embodiments to a specific embodiment form. Instead, modifications, equivalents and replacements included in the disclosed concept and technical scope of this embodiment may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the present disclosure.

The terms used herein are solely intended to explain a specific exemplary embodiment, and not to limit the scope of the present disclosure. Singular forms are intended to include plural forms unless the context clearly indicates otherwise. The singular expression also includes the plural meaning as long as it does not differently mean in the context. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an example embodiment, 'a module' or 'a unit' performs at least one function or operation, and may be hardware, such as a processor or integrated circuit, software that is executed by a processor, or a combination thereof. In addition, a plurality of 'modules' or 'units' may be integrated into at least one module and may be realized as at least one process or processor (not shown) except for 'modules' or 'units' that should be realized in specific hardware.

Figure 1:
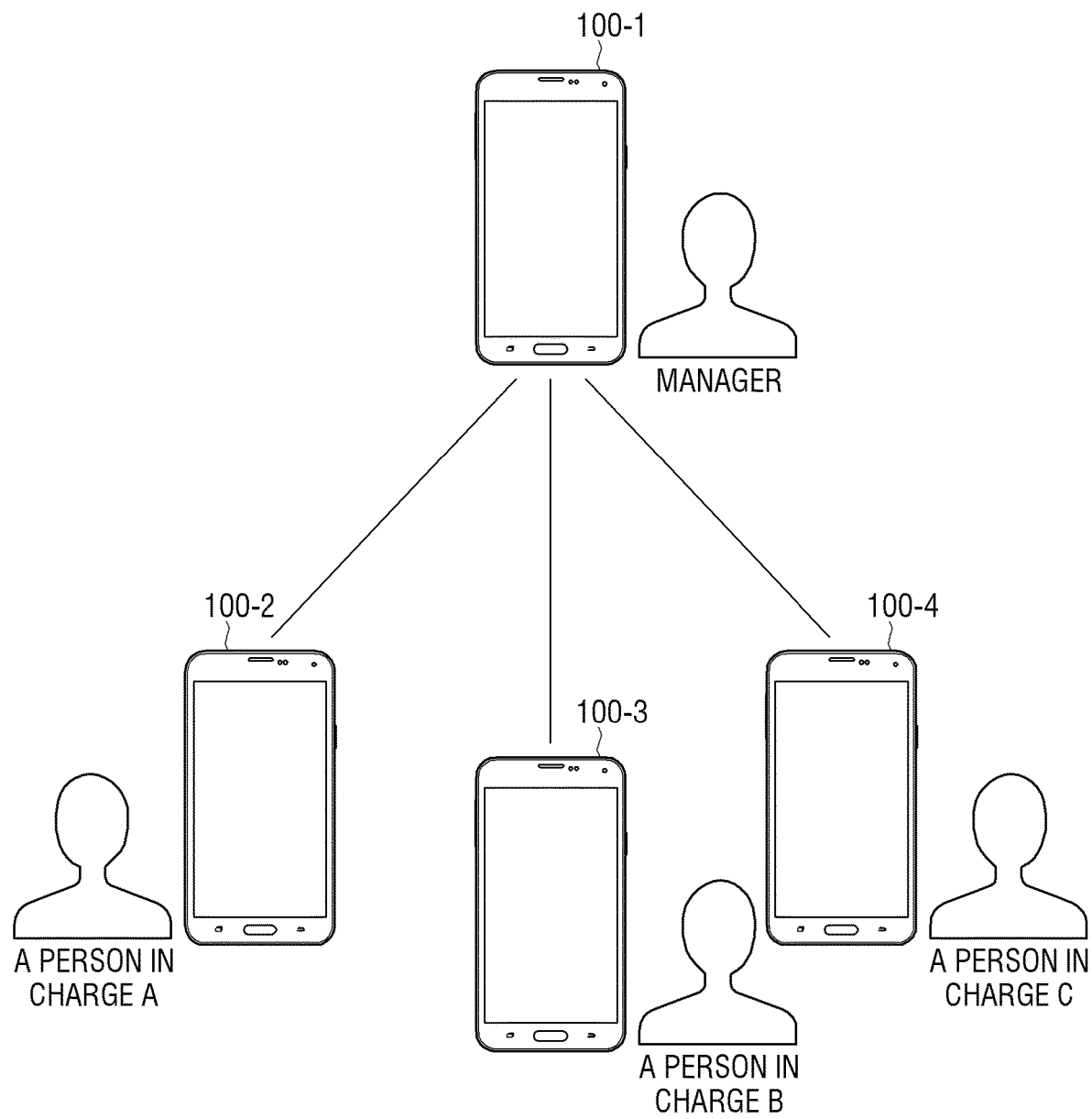
FIG. 1 is a first exemplary diagram illustrating a system which provides a group communication according to an embodiment.
Figure 2:
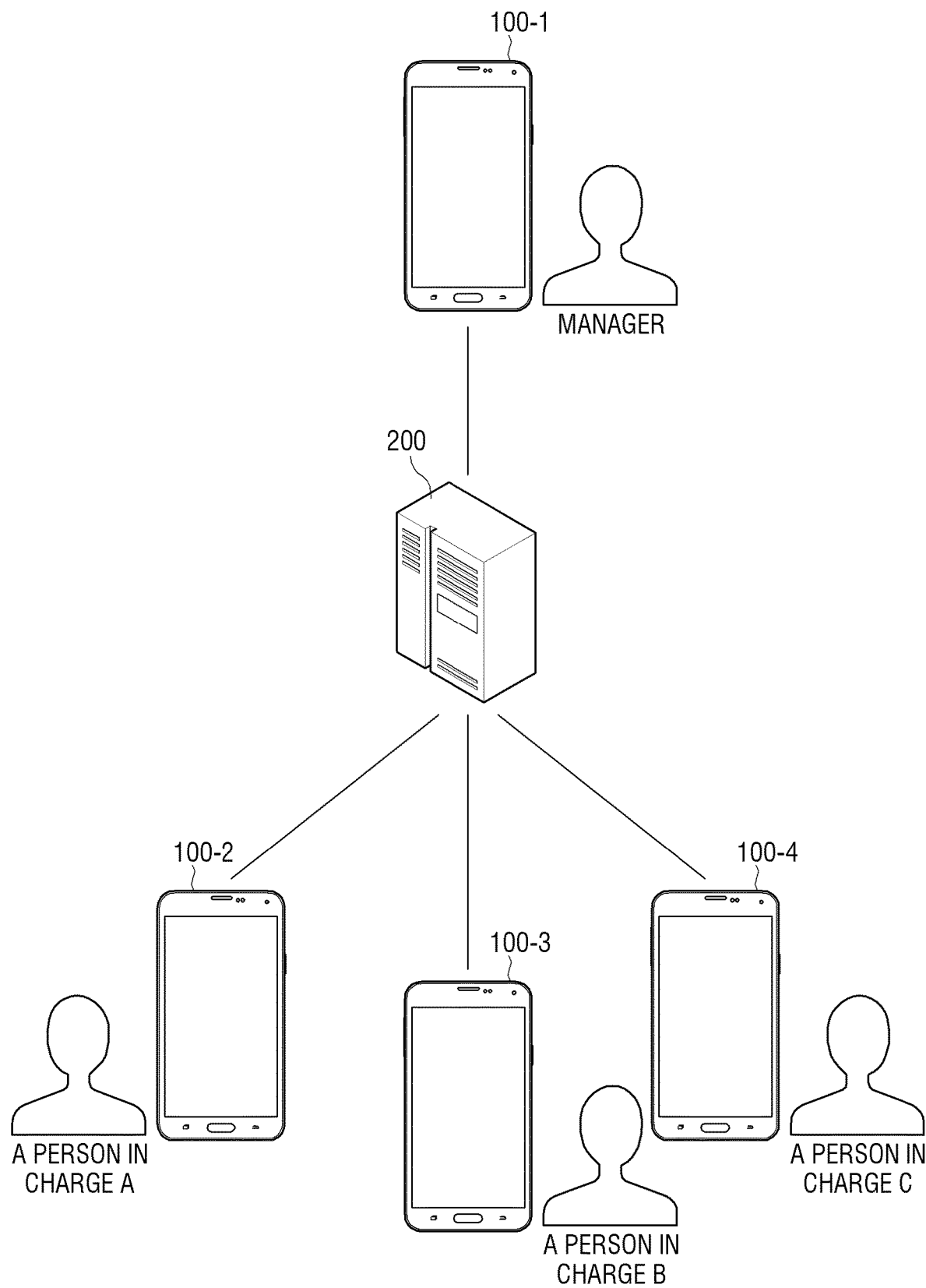
FIG. 2 is a second exemplary diagram illustrating a system which provides a group communication according to another embodiment.

FIG. 1 is a first exemplary diagram illustrating a system which provides a group communication according to an embodiment, and FIG. 2 is a second exemplary diagram illustrating a system which provides a group communication according to another embodiment.

As illustrated in FIG. 1, a system which provides a group communication includes a plurality of user terminal apparatuses 100-1 to 100-4. Here, the plurality of user terminal apparatuses 100-1 to 100-4 may be terminal apparatuses which are set as a group so as to perform a group communication.

The plurality of user terminal apparatuses 100-1 to 100-4 set as a group may execute an application for a Push to Talk (PTT). Here, the application for the PTT is an application in which the plurality of user terminal apparatuses 100-1 to 100-4 set as a group do not perform a voice call through a wireless communication network, but use a voice call service through a specific frequency in a one to one or one to N method, like a wireless set.

As such, at least one of the plurality of user terminal apparatuses 100-1 to 100-4 in which an application for the PTT talk is executed may receive and transmit voice data of a user with a remaining user terminal apparatus 100.

For example, a manager who manages entire hotel may request a confirmation on whether there is any problem in the area managed by each person in charge, to a second to fourth user terminal apparatuses 100-2 to 100-4 of a person in charge A to a person in charge C which are set as a group with a manager, by using the first user terminal apparatus 100-1 in which the application for the PTT is executed. Here, the people in charge, A to C, may be people in charge of each floor of the hotel by being set as a group with the manager.

Specifically, a manager may give an order that "Please confirm whether there is any problem in each floor" to the person in charge of each floor by using the first user terminal apparatus 100-1. Accordingly, the first user terminal apparatus 100-1 may transmit voice data with regard to the order voice of the manager that "Please confirm whether there is any problem in each floor" to the second to fourth user terminal apparatuses 100-2 to 100-4 which are set as a group with the first user terminal apparatus 100-1.

Accordingly, the second to fourth user terminal apparatuses 100-2 to 100-4 output a voice message with regard to an order voice received from the first user terminal apparatus 100-1. Accordingly, the people in charge A to C may confirm the order of the manager from the voice message output through the possessing second to fourth user terminal apparatuses 100-2 to 100-4.

The people in charge A to C who confirmed the order of the manager may report the current status of each floor they are managing by using the second to fourth user terminal apparatuses 100-2 to 100-4.

Accordingly, the second to fourth user terminal apparatuses 100-2 to 100-4 transmit a user voice reported by the people in charge A to C to the first user terminal apparatus 100-1. Accordingly, the first user terminal apparatus 100-1 may output a voice message with regard to the user voice received from the second to fourth user terminal apparatuses 100-2 to 100-4, and the manager may grasp the current status of each floor through the voice message output by the first user terminal apparatus 100-1.

Meanwhile, the first user terminal apparatus 100-1 may output the voice message with regard to the received user voice form the second to fourth user terminal apparatuses 100-2 to 100-4 through the following embodiment.

According to an embodiment, the first user terminal apparatus 100-1 may output a voice message with regard to the user voice received from the second to fourth user terminal apparatuses 100-2 to 100-4 based on the time order that a user voice is received from the second to fourth user terminal apparatuses 100-2 to 100-4.

According to another embodiment, when the user voice is received from the second to fourth user terminal apparatuses 100-2 to 100-4, the first user terminal apparatus 100-1 analyzes a similarity of the voice message with regard to the received user voice and outputs the voice message of which similarity is different, firstly.

For example, if a problem occurs in the first floor managed by a person in charge A, A may transmit a user voice that "A problem occurred in the first floor" through the second user terminal apparatus 100-2 to the first user terminal apparatus 100-1, and if there is no problem in the floors managed by a person in charge B and a person in charge C, B and C may transmit a user voice that "There is no problem" to the first user terminal apparatus 100-1 through the third and fourth user terminal apparatuses 100-3 and 100-4.

If a user voice such that is received, the first user terminal apparatus 100-1 determines that the user voice received from the second user terminal apparatus 100-2 is different from other user voices, and may output the voice message with regard to the user voice received from the second user terminal apparatus 100-2 firstly.

Accordingly, the manager may confirm the voice message firstly output and grasp the status of the floor managed by A quickly.

According to another embodiment, the first user terminal apparatus 100-1 may output the voice message with regard to the user voice received from the second to fourth user terminal apparatuses 100-2~100-4 based on the order that an utterance request message is received from the second to fourth user terminal apparatuses 100-2~100-4 with regard to the order instructed by the manager.

That is, if the voice message with regard to the order voice of the manager received from the first user terminal apparatus 100-1 is output through the second to fourth user terminal apparatuses 100-2 to 100-4, the people in charge A to C may request an utterance authority for reporting the current status of each floor. According to the utterance authority request, the second to fourth user terminal apparatuses 100-2 to 100-4 transmits the utterance request message to the first user terminal apparatus 100-1, and the first user terminal apparatus 100-1 set the utterance authority with regard to the second to fourth user terminal apparatuses 100-2~100-4 based on the order that the utterance request message is received.

For example, the utterance request message transmitted from the second user terminal apparatus 100-2 may be received firstly, and the utterance request message transmitted from the fourth user terminal apparatus 100-4 may be received lastly. In this case, the first user terminal apparatus 100-1 set the utterance authority of the second user terminal apparatus 100-2 which transmitted the utterance request message firstly as a first priority, set the utterance authority of the third user terminal apparatus 100-3 as a second priority, and set the utterance authority of the fourth user terminal apparatus 100-4 as a third priority. If the order of the utterance authority is set, the first user terminal apparatus 100-1 transmits an informing message according to the setting of the utterance authority to the second user terminal apparatus 100-2 set as the first priority. Accordingly, the second user terminal apparatus 100-2 of which utterance authority is set as the first priority transmits the user voice of the user A to the first user terminal apparatus 100-1.

If a user voice is received from the second user terminal apparatus 100-2 of which utterance authority is set as the first priority, the first user terminal apparatus 100-1 transmits an informing message according to the setting of the utterance authority to the third user terminal apparatus 100-3 of which utterance authority is set as the second priority, and the third user terminal apparatus 100-3 transmits the user voice of user B to the first user terminal apparatus 100-1.

If a user voice is received from the third user terminal apparatus 100-3 of which utterance authority is set as the second priority, the first user terminal apparatus 100-1 transmits an informing message according to the setting of the utterance authority to the fourth user terminal apparatus 100-4 of which utterance authority is set as the third priority, and the fourth user terminal apparatus 100-4 transmits the user voice of user C to the first user terminal apparatus 100-1.

Accordingly, each person in charge may resolve an inconvenience of confirming whether a communication is being proceeded between a manager and a person in charge in real time when the utterance authority is given to the person in charge, by reporting the current status to the manager through their own user terminal apparatus 100.

Meanwhile, the system providing a group communication according to an embodiment may further include a management server 200 in addition to the above described plurality of user terminal apparatuses 100-1~100-4. The management server 200 may be a repeating installation which transmits a user voice received and transmitted between the plurality of user terminal apparatuses 100-1~100-4 set as a group.

That is, as described above, the management server 200 transmits the order voice of the manager received from the first user terminal apparatus 100-1 to the second to fourth user terminal apparatuses 100-2~100-4 set as a group with the first user terminal apparatus 100-1, and transmits the user voice received from the second to fourth user terminal apparatuses 100-2~100-4 to the first user terminal apparatus 100-1 based on the order of reception.

Hereinafter the operation of receiving and transmitting a user voice between the plurality of user terminal apparatuses 100-1~100-4 set as a group, will be described in detail.

Figure 3:
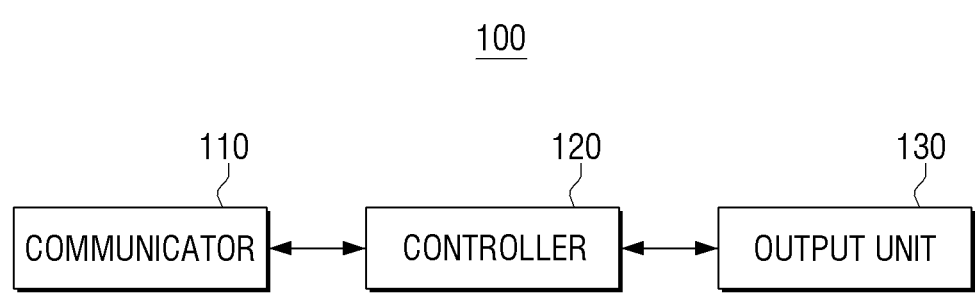
FIG. 3 is a block diagram illustrating a user terminal apparatus according to an embodiment.
Figure 4:
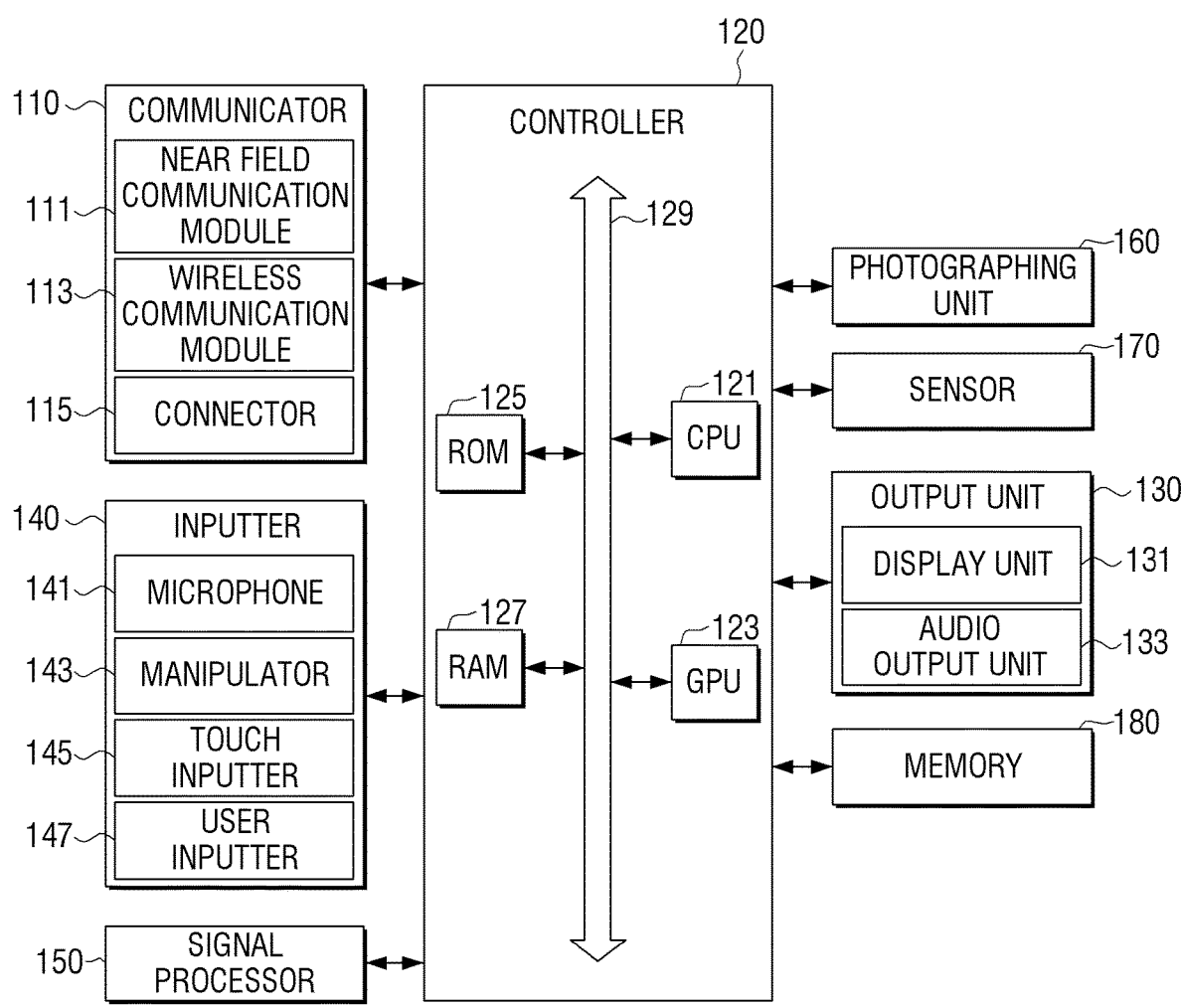
FIG. 4 is a detailed block diagram illustrating a user terminal apparatus according to an embodiment.

FIG. 3 is a block diagram illustrating a user terminal apparatus according to an embodiment, and FIG. 4 is a detailed block diagram illustrating a user terminal apparatus according to an embodiment.

As illustrated in FIG. 3, the user terminal apparatus 100 includes a communicator 110, a controller 120, and an output unit 130.

The communicator 110 performs a data communication with the plurality of user terminal apparatus 100 (hereinafter referred to as other user terminal apparatuses).

As illustrated in FIG. 4, the communicator 110 may include a connector 115 which includes at least one of a wireless communication module 113 such as a near field communication (NFC) module 111 and a wireless local access network (LAN) module, and wired communication modules such as a high-definition multimedia interface (HDMI), a universal serial bus (USB), Institute of Electrical and Electronics Engineers (IEEE) 1394.

The NFC module 111 is configured to wirelessly perform NFC between the plurality of other user terminal apparatuses 100 set as the same group with the user terminal apparatus 100. The NFC module 111 may include at least one of a Bluetooth module, an infrared data association (IrDA) module, an NFC module, a WIFI module, and a Zigbee module.

The wireless communication module 113 is a module which is connected to an external network according to a wireless communication protocol such as the IEEE and performs a communication. In this case, the user terminal apparatus 100 may perform a data communication with the plurality of user terminal apparatuses 100 set as the same group through the above-mentioned management server 200.

In addition, the wireless communication module may further include a mobile communication module which is connected to a mobile communication network according to various mobile communication standards such as 3rd generation (3G), 3rd generation partnership project (3GPP), and long term evolution (LTE) to perform communications.

As such, the communicator 110 may be implemented by the above-mentioned various short range communication schemes and may adopt other communication technologies not mentioned in the present embodiment as needed.

Meanwhile, the connector 115 is configured to provide an interface with various source devices such as USB 2.0, USB 3.0, HDMI, and IEEE 1394. The connector 115 may receive content data transmitted from an external server (not illustrated) through a wired cable connected to the connector 115 according to the control command of the controller 120 to be described later or may transmit pre-stored content data to an external recording medium. In addition, the connector 115 may receive a power from a power source through a wired cable physically connected with the connector 115.

If a user voice is received from a plurality of other user terminal apparatuses 100 set as a group with the user terminal apparatus 100 through the communicator 110, the controller 120 may determine the output order of the voice message corresponding to the user voice received from the plurality of other user terminal apparatuses 100 according to a predetermined condition.

The output unit 130 outputs a voice message corresponding to the user voice received from the plurality of other user terminal apparatuses 100 based on the output order determined through the controller 120.

Specifically, if a user voice is received from the plurality of other user terminal apparatuses 100 set as a group with the user terminal apparatus 100 through the communicator 110, the controller 120 may determine an output order of a voice message corresponding to the user voice received from the plurality of other user terminal apparatuses 100 through the embodiment as follows.

According to an embodiment, if the user voice is received from the plurality of other user terminal apparatuses 100, the controller 120 may output the voice message corresponding to a user voice received from the plurality of other user apparatuses 100 based on the order that the user voice is received.

For example, as illustrated in FIG. 1, the user voice transmitted from the second user terminal apparatus 100-2 among the second to fourth user terminal apparatuses 100-2~100-4 is received firstly, and the user voice transmitted from the fourth user terminal apparatus 100-4 may be received the latest.

In this case, the controller 120 may determine an output order so that the voice message with regard to the user voice received from the second user terminal apparatus 100-2 is output for the first time, the voice message with regard to the user voice received from the third user terminal apparatus 100-3 is output next, and the voice message with regard to the user voice received from the fourth user terminal apparatus 100-4 is output the latest.

According to another embodiment, the controller 120 may determine the output order of the voice message corresponding to the user voice received from the plurality of other user terminal apparatuses 100 based on the order that an utterance request message is received from the plurality of other user terminal apparatuses 100.

For example, as illustrated in FIG. 1 described above, an utterance request message transmitted from the second user terminal apparatus 100-2 among the plurality of user terminal apparatuses 100 is received firstly, and the utterance request message transmitted from the fourth user terminal apparatus 100-4 may be received the latest. Thereafter, a user voice may be received from the second to fourth user terminal apparatuses 100-2~100-4. That is, the user voice of the fourth user terminal apparatus 100-4 which transmitted the utterance request message the latest may be received firstly, and the user voice of the second user terminal apparatus 100-2 which transmitted the utterance request message firstly may be received the latest.

In this case, the controller 120 may determine the output order so that the user voice of the second user terminal apparatus 100-2 is output firstly, thereafter, the user voice of the third user terminal apparatus 100-3 is output, and the user voice of the fourth user terminal apparatus 100-4 is output the latest, based on the order that the utterance request messages are received from the second to fourth user terminal apparatuses 100-2~100-4.

For another example, the utterance request message transmitted from the second user terminal apparatus 100-2 among the plurality of other user terminal apparatuses 100 may be received firstly, and the utterance request message transmitted from the fourth user terminal apparatus 100-4 may be received the latest.

In this case, the controller 120 may set an utterance authority based on the order that the utterance request messages are received from the second to fourth user terminal apparatuses 100-2~100-4. Thereafter, the controller 120 may control the communicator 110 so that a user voice is received from the second to fourth user terminal apparatuses 100-2~100-4 based on the set utterance authority order.

Accordingly, the communicator 110 may receive a user voice from the second to fourth user terminal apparatuses 100-2~100-4 based on the set utterance authority order.

According to another embodiment, the controller 120 may analyze the similarity of the voice messages corresponding to the user voices received from the plurality of other user terminal apparatuses 100 and determine the output order according to the order of the voice messages of which similarity is different.

For example, the manager who manages an entire hotel may order the person in charge of each floor to report the current status of each floor. According to such order of the manager, the person in charge of each floor may report the current status of the floor managed by himself/herself.

If a problem occurred on the first floor, A who manages the first floor may transmit a user voice "A problem occurred on the first floor" through the second user terminal apparatus 100-2 to the user terminal apparatus 100-1, and B and C who manage the remaining floors may transmit a user voice "There is no problem" to the user terminal apparatus 100-1 through the third and fourth user terminal apparatuses 100-3 and 100-4.

If such user voice is received, the controller 120 analyzes a similarity of voice messages corresponding to the user voices received from the second to fourth user terminal apparatuses 100-2~100-4. As a result of the analyzation, if it is determined that the user voice received from the second user terminal apparatus 100-2 is different from the voice of other users, the controller 120 may determine the output order to output the voice message regarding the user voice received from the second user terminal apparatus 100-2 firstly.

Meanwhile, if the output order is determined through the above various embodiments, the output unit 130 may output the voice messages corresponding to the user voices received from the plurality of other user terminal apparatuses 100 based on the determined output order.

Meanwhile, the output unit 130 may output the voice messages corresponding to the user voices through at least one of a display unit 131 and an audio output unit 133.

The display unit 131 may display the voice message corresponding to a user voice on a screen in a form of text, and the audio output unit 133 may output the voices corresponding to the user voices as an audio signal in a form of an audible sound.

Especially, the display unit 131 may display a content received from an external server such as a content server (not illustrated) or data related to a pre-stored content, or display various UI screens for controlling the operation of the user terminal 100.

The display unit 131 may be implemented as a liquid crystal display (LCD), an organic light emitting display (OLED), a plasma display panel (PDP), or the like. In particular, the display unit 131 may be implemented in a form of a touch screen forming a mutual layer structure with a touch input unit 145 receiving a touch command of a user to be described below.

Meanwhile, before outputting a voice message corresponding to such user voice, the controller 120 controls the display unit 131 to display an output UI including an execution icon regarding a voice message corresponding to a user voice received from the plurality of user terminal apparatuses 100. According to the control command, the display unit 131 displays an output UI including an execution icon regarding the voice message. Here, the execution icon included in the output UI may be arranged in the order of a voice message corresponding to a predetermined output order.

While the output UI is displayed, if a selection command on the execution icon included in the output UI is input, the controller 120 may control at least one of the display unit 131 and the audio output unit 133 so as to output a voice message regarding the icon corresponding to the selection command.

Accordingly, at least one of the display unit 131 and the audio output unit 133 may output the voice message regarding the icon corresponding to the selection command in a form of a text or an audible sound.

According to another embodiment, the display unit 131 may display a channel list UI for each group. Here, the channel list may be list information in which an object for identifying the group in which a user belongs to is listed.

Accordingly, while the channel list UI is displayed, if one of an object for each group included in the channel list UI is selected, the controller 120 may select the group corresponding to the selected object as a conversation partner group, and control the communicator 110 to transmit order voice of a user to the plurality of other user terminal apparatuses 100 included in the conversation partner group.

Accordingly, the communicator 110 may transmit voice data regarding the order voice of the user to at least one of the plurality of other user terminal apparatuses 100 included in the conversation partner group.

Meanwhile, if a user voice is received from at least one of the other user terminal apparatuses 100 which transmitted voice data with regard to an order voice, the controller 120 may control the display unit 131 to display reception status information on the received user voice. Accordingly, the display unit 131 may display, on the object selected as a conversation partner group, the reception status information on the user voice received from at least one of the other user terminal apparatuses 100 included in the corresponding conversation partner group. Accordingly, a user may confirm whether a user voice is received from other user terminal apparatuses 100 included in the conversation partner group based on the reception status information displayed on the object, and also confirm how many user voices have been received currently.

Meanwhile, the controller 120 may control the communicator 110 to transmit an utterance request message to the first user terminal apparatus 100-1 which transmitted an order voice, according to a user request for an utterance request in the status in which an order voice is received from the first user terminal apparatus 100-1 among the plurality of other user terminal apparatuses 100 set as a group. Accordingly, the communicator 110 may transmit an utterance request message to the first user terminal apparatus 100-1 which transmitted the order voice.

When an utterance authority is set from the first user terminal apparatus 100-1 which transmitted the utterance request message, the controller 120 may control the communicator 110 to transmit the user voice with regard to an order voice to the first user terminal apparatus 100-1. Accordingly, the communicator 110 may transmit the user voice with regard to the order voice to the first user terminal apparatus 100-1.

Specifically, the first user terminal apparatus 100-1 may set an utterance authority of a user based on the utterance request message received from the user terminal apparatus 100. If an utterance authority is set, the first user terminal apparatus 100-1 transmits an informing message according to an utterance authority setting to the user terminal apparatus 100 based on the order that the utterance authority is set.

For example, if an utterance authority is set so that the user of the user terminal apparatus 100 may utter firstly, the first user terminal apparatus 100-1 may transmit an informing message according to the utterance authority setting to the user terminal apparatus 100.

Meanwhile, if the utterance authority is set so that the user of the user terminal apparatus 100 may utter the latest, the first user terminal apparatus 100-1 may transmit an informing message according to the utterance authority setting to the user terminal apparatus 100 after a user voice is received from the other user terminal apparatus 100 corresponding to a previous order.

If such informing message is received, the controller 120 may provide a service which informs an utterance possible status with regard to an order voice based on at least one of a vibration feedback and a notification feedback. If a user voice is received when the utterance authority is assigned, the controller 120 controls the communicator 110 to transmit a user voice with regard to an order voice to the first user terminal apparatus 100-1. Accordingly, the communicator 110 may transmit a user voice with regard to the order voice to the first user terminal apparatus 100-1.

Meanwhile, if the user terminal apparatus 100 according to the embodiment is implemented as a mobile terminal apparatus such as a smart phone and a tablet PC, as illustrated in FIG. 4 in addition to the above-described configuration, the user terminal apparatus 100 may further include an inputter 140, a signal processor 150, a photographer 160, a sensor 170, and a memory 180.

The inputter 140 is an input mean for receiving various user commands and transmit the commands to the controller 120, which may include a microphone 141, a manipulator 143, a touch input unit 145, and a user input unit 147, as illustrated in FIG. 4.

The microphone 141 receives a voice input from a user, and the manipulator 143 may be implemented by a key pad including various function keys, a numeric key, a special key, a character key, or the like. In addition, if the above described display unit 131 is implemented in a form of a touch screen, the touch input unit 145 may be implemented as a touch pad which organizes a layer form with the display unit 131. In this case, the touch input unit 145 may receive a selection command with regard to an icon related to various applications displayed through the display unit 131.

The user input unit 147 may receive an infrared (IR) signal or a radio frequency (RF) signal for controlling the operation of the user terminal apparatus 100 from at least one peripheral device (not illustrated) like a remote control device.

The signal processor 150 may be an element for processing image data and audio data of the content stored in the content received through the communicator 110 or the content stored in the memory 180 according to a control command of the controller 120. Specifically, the signal processor 150 may perform various image processes, such as decoding, scaling, noise filtering, frame rate conversion, and resolution conversion, on the image data included in the content. In addition, the signal processor 150 may perform various audio signal processing, such as decoding, amplification, and noise filtering on the audio data included in the content.

The photographer 160 is to photograph still images or moving images according to the user command and may be implemented in plural like a front camera and a rear camera.

The sensor 170 is a sensing sensor that senses the motion of the user terminal 100 and referring to an embodiment, may include an accelerometer sensor, a magnetic sensor, a gravity sensor, and a gyroscope sensor.

The accelerometer sensor is a sensor which measures an intensity of an acceleration or an impact of a moving user terminal apparatus 100, and the magnetic sensor is a sensor which may detect an azimuth by using an earth's magnetic field. In addition, the gravity sensor is a sensor which detect a moving direction of gravity which detects a direction by rotating automatically according to the direction that a user is holding the user terminal apparatus 100. The gyroscope sensor adds a rotation to each of an existing acceleration sensor to help to recognize a 6-axis direction so as to recognize more specific and precise operation.

The memory 180 stores an execution program and content with regard to various application which include an application with regard to the above described PTT. In addition, the memory 180 may store a user voice and an utterance request message received from the plurality of other user terminal apparatuses 100 set as a group.

Additionally, the memory 180 may further store an operation program for controlling the operation of the user terminal apparatus 100. Here, if the user terminal apparatus 100 is turned on, the operation program is read and complied in the memory 180 so as to move each configuration of the user terminal apparatus 100.

Meanwhile, the above-mentioned controller 120 may further include a central processing unit (CPU) 121, a graphic processing unit (GPU) 123, read-only memory (ROM) 125, and random access memory (RAM) 127, and the CPU 121, GPU 123, ROM 125 and the RAM 127 may be connected to each other through a bus 129.

The CPU 121 access the memory 180 and perform booting by using an Operating System (OS) stored in the memory 180. In addition, the CPU 121 may perform various operations using various programs, contents, data, and so on, which are stored in the storage 180.

The GPU 123 generates a display screen which includes various objects such as an icon, image, text, etc. Specifically, GPU 123 calculates attribute values of objects to be displayed according to a layout of the screen, such as a coordinate value, a shape, a size, a color, etc., based on a received control command, and generates a display screen in various layouts including the objects based on the calculated attribute value.

The ROM 125 stores a command set for booting a system. If a turn-on command is input and a power is supplied, the CPU 121 copies the O/S stored in the memory 180 into the RAM 127 according to the command stored in the ROM 125, and boots the system by executing the O/S. When the booting is completed, the CPU 121 may copy the various programs stored in the memory 180 to the RAM 127, and perform various operations by implementing the programs copied to the RAM 127.

The controller 120 may be implemented as a system-on-a-chip (SOC) or a system on chip (SoC) by being combined with various components described above.

Meanwhile, the above-described operations of the processor 120 may be performed through the programs stored in the storage unit 180. Here, the memory 180 may be implemented as at least one of a memory card (e.g., an SD card and a memory stick) which can be mounted in or dismounted from a ROM 125, a RAM 127, or the user terminal apparatus 100, a non-volatile memory, a volatile memory, a hard disk drive (HDD), and a solid state drive (SSD).

Hereinafter the user terminal apparatus 100 which performs a group communication will be described in more detail through various embodiments.

Figure 5:
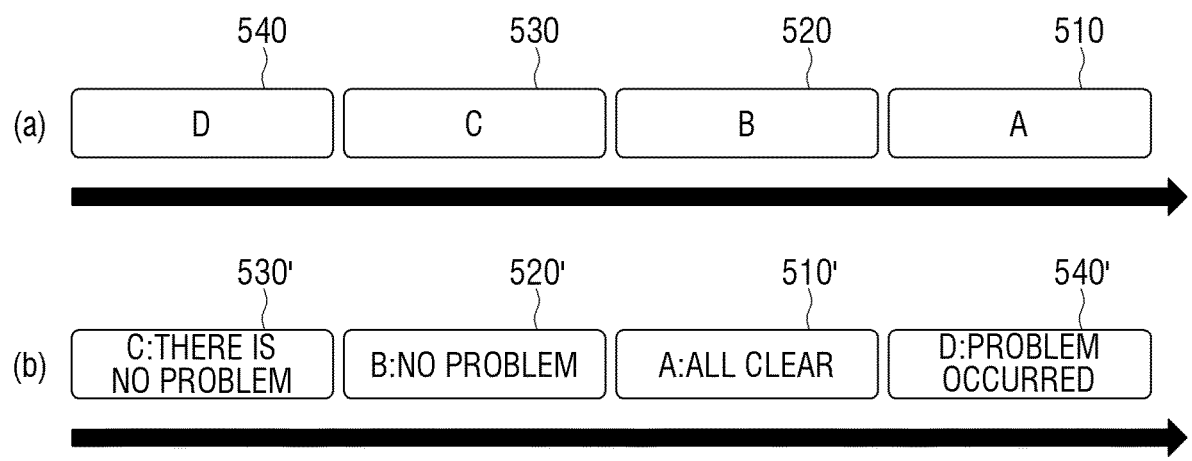
FIG. 5 is an exemplary diagram illustrating a determination of an output order of a voice message in a user terminal apparatus according to an embodiment.

FIG. 5 is an exemplary diagram illustrating a determination of an output order of a voice message in a user terminal apparatus according to an embodiment.

The user terminal apparatus 100 transmits voice data with regard to an order voice of a user to the plurality of other user terminal apparatuses 100 set as a group. Accordingly, the plurality of other user terminal apparatuses 100 set as a group transmit the user voice to the user terminal apparatuses 100 which transmitted the voice data with regard to the order voice.

As described above, the user who requests an order voice transmission may be a manager who manages an entire hotel, and the user who requests a user voice transmission with regard to the order voice may be a person in charge of each floor of the hotel.

In this case, the manager may give an order "Please confirm whether there is any problem in each floor" to the person in charge of each floor by using the user terminal apparatus 100. Accordingly, the user terminal apparatus 100 may transmit the voice data with regard to the order voice of the manager, "Please confirm whether there is any problem in each floor" to the plurality of other user terminal apparatuses 100 set as a group with the user terminal apparatus 100.

Accordingly, the plurality of other user terminal apparatuses 100 output a voice message on the order voice received from the user terminal apparatus 100. Accordingly, the people in charge A to D may confirm the order given by the manager from the voice message output through the user terminal apparatus 100 they are possessing.

The people in charge A to D who confirmed the order of the manager may report the current status of each floor managed by A to D by using the possessing user terminal apparatus 100. Accordingly, each of the user terminal apparatus 100 of A to D transmits the user voice reported by A to D to the user terminal apparatus 100.

Accordingly, if the user voice is received from each user terminal apparatus 100 of A to D, the user terminal apparatus 100 determines an output order based on the order that the user voice is received. The user voices of A, B, C, and D are received in the order of A, B, C, and D, the user terminal apparatus 100 may determine the output order so that the user voices are output in the order of A voice message 510 corresponding to the user voice of A, B voice message 520 corresponding to the user voice of B, C voice message 530 corresponding to the user voice of C, and D voice message 540 corresponding to the user voice of D, as illustrated in (a) of FIG. 5.

Meanwhile, before determining the output order according to the order that the user voice is received, the user terminal apparatus 100 may analyze a similarity of the voice messages corresponding to the user voices and determine the output order so as to output the voice message of which similarity is different firstly.

For example, if a problem occurs in the first floor managed by the person in charge D, the user terminal apparatus 100 may receive a user voice "A problem has occurred in the first floor" from the user terminal apparatus 100 of D, and receive the user voices "There is no problem", "No problem", and "All clear" from each user terminal apparatus 100 of remaining A to C.

In this case, the user terminal apparatus 100 determines that the voice message with regard to the user voice received from the user terminal apparatus 100 of D is different from the other voice messages.

According to an embodiment, the user terminal apparatus 100 may determine the similarity of the voice message corresponding to the user voice by using a similarity algorithm, or determine whether there is a voice message in which an event occurred among the received voice messages by comparing with a pre-registered sentence.

If it is determined that the voice message received from the user terminal apparatus 100 of D is different from the other voice messages in the above mentioned embodiment, as illustrated in FIG. 5, the user terminal apparatus 100 may determine the output order so as to firstly output D voice message 540' corresponding to the user voice of the user terminal apparatus 100 of D which has been received the latest, and then output the voice messages A to C 510'~530' corresponding to user voices received from the user terminal apparatuses 100 of the remaining A to C, based on the order of reception.

Accordingly, among the voice messages A to D, the D voice message of which similarity is different may be output firstly, and after the D message is output, the A to C voice messages may be output sequentially.

Figure 6:
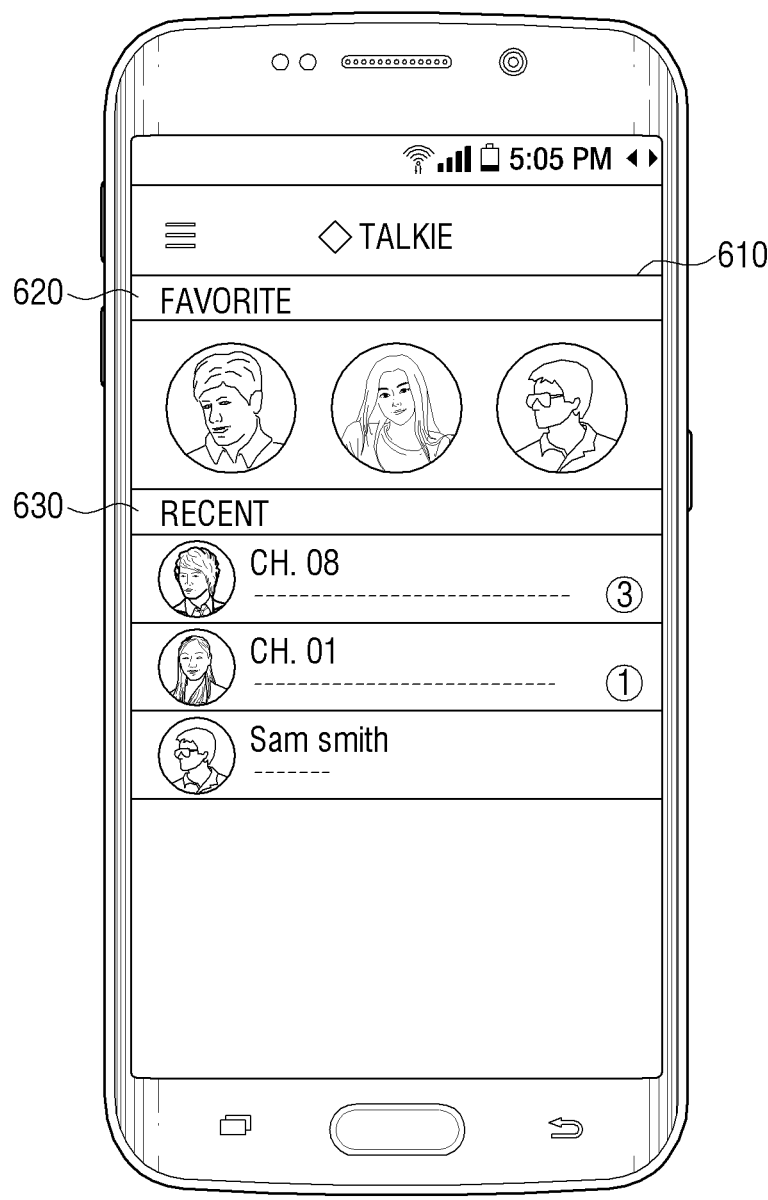
FIG. 6 is an exemplary diagram illustrating a display of a channel list UI in a user terminal apparatus according to an embodiment.

FIG. 6 is an exemplary diagram illustrating a display of a channel list UI in a user terminal apparatus according to an embodiment.

As illustrated in FIG. 6, the user terminal apparatus 100 may display a channel list 610 with regard to all groups in which a user is included.

The user terminal apparatus 100 may provide a channel list UI 610 in various forms according to a user setting.

In detail, the user terminal apparatus 100 may provide the channel list UI 610 which includes an object for each group with regard to entire groups in which a user is included.

In this case, the user may easily confirm in which group the user is registered, through the channel list UI 610 displayed on the screen of the user terminal apparatus 100.

In addition, the user terminal apparatus 100 may display the channel list UI 610 with regard to the group in which the user often participates and the group in which the user participated lately among entire groups in which the user is included, according to the second user setting. That is, the user terminal apparatus 100 may display the channel list UI 610 which includes the first category menu 620 which includes an object of the group in which the user often participates and the second category menu 630 which includes the object of the group participated lately.

In this case, the user may easily select the group in which the user often participates through the first and second category menus 620 and 630 included in the channel list UI 610 displayed on the screen of the user terminal apparatus 100, and also easily confirm in which group the user participated lately.

Figure 7:
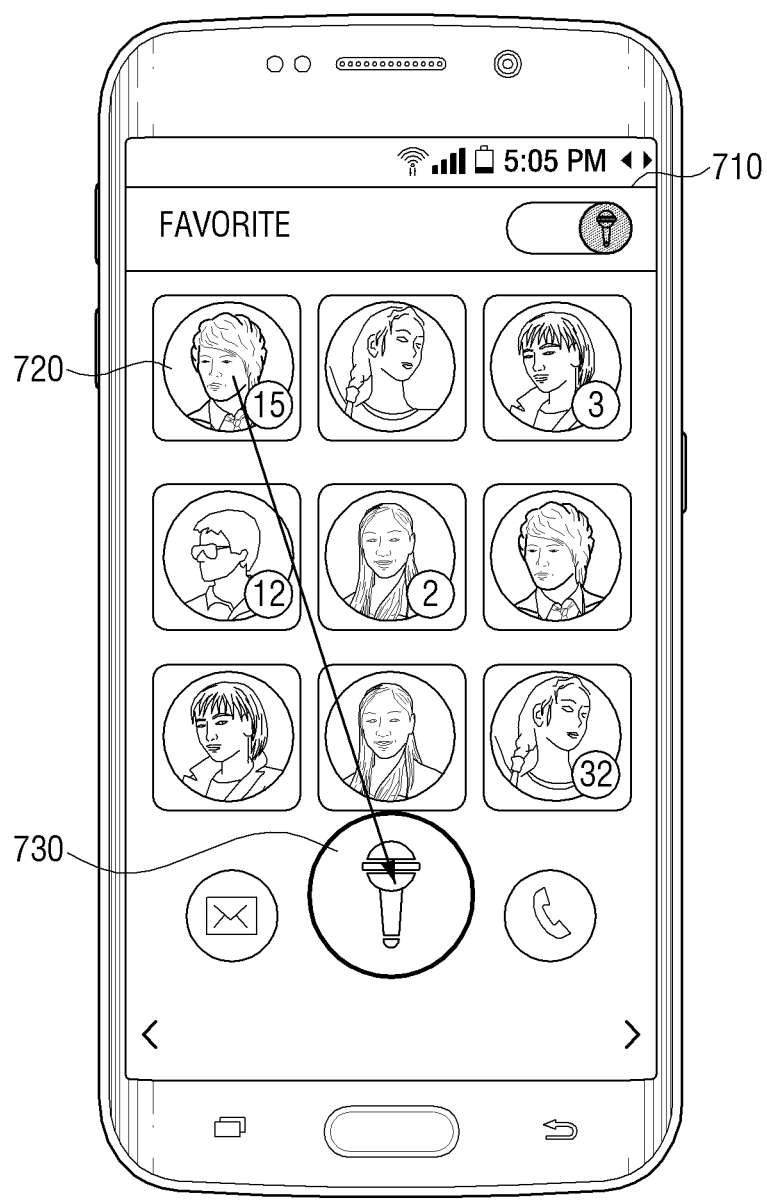
FIG. 7 is an exemplary diagram illustrating a selection of a conversation partner group in a user terminal apparatus according to an embodiment.

FIG. 7 is an exemplary diagram illustrating a selection of a conversation partner group in a user terminal apparatus according to an embodiment.

As illustrated in FIG. 7, the user terminal apparatus 100 may set one group among the groups included in the channel list UI 610 displayed on the screen of the user terminal apparatus 100, as a conversation partner group according to a user command.

Specifically, as illustrated in FIG. 6, the user may select one of the first and the second category menus 620 and 630 from the channel list UI 610 displayed on the screen of the user terminal apparatus 100. As described above, the first category menu 620 is the menu which includes the objects of the group in which the user often participates among the entire groups in which the user is included, and the second category menu 630 may be the menu which includes the object of the group in which the user participated lately.

If the first category menu 620 is selected between the first and second category menus 620 and 630, the user terminal apparatus 100 may display the UI 710 which includes an object of the group included in the first category menu 620, as illustrated in FIG. 7.

While the UI 710 is displayed, the user may select the first object 720 among the plurality of objects included in the UI 710, and drag the selected first object 720 to the execution object 730 for setting a conversation partner group. When the user command is input, the user terminal apparatus 100 sets the group corresponding to the first object 720 as the conversation partner group.

Thereafter, when a user voice is input from the user, the user terminal apparatus 100 may transmit the user voice to the plurality of other user terminal apparatuses 100 included in the group set as the conversation partner group, and output a voice message regarding the user voice received regarding the corresponding user voice received from the plurality of other user terminal apparatuses 100.

Figure 8:
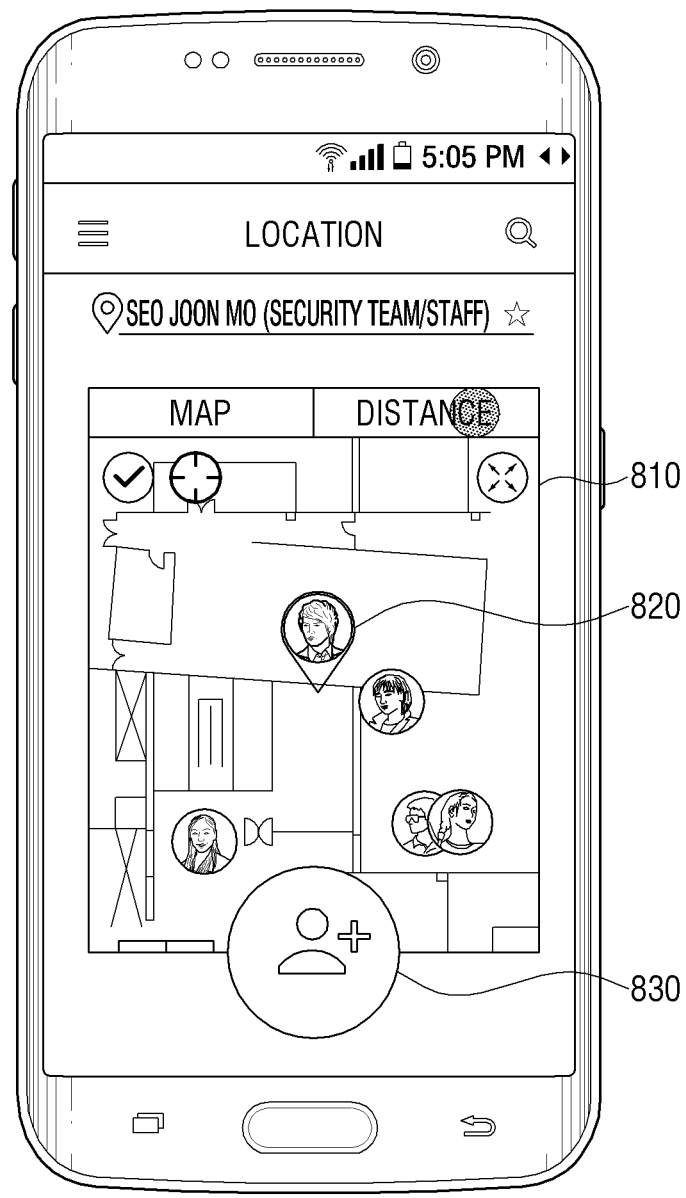
FIG. 8 is an exemplary diagram illustrating a selection of a conversation partner in a user terminal apparatus according to an embodiment.

FIG. 8 is an exemplary diagram illustrating a selection of a conversation partner in a user terminal apparatus according to an embodiment.

As illustrated in FIG. 8, the user terminal apparatus 100 may display a map UI 810 with regard to a pre-registered building. In addition, if location information is received from another user terminal apparatus 100 located in a peripheral area of the user terminal apparatus 100, the user terminal apparatus 100 may display the point in which the user of the other user terminal apparatuses 100 is located, on the map UI 810 displayed based on the received location information.

Accordingly, the manager who manages an entire building may grasp the location of the person in charge of each area through the map UI 810 displayed on the screen of the user terminal apparatus 100. In addition, the manager may give an order to the person in charge of each area through the map UI 810 displayed on the screen of the user terminal apparatus 100.

For this, the manager may select an object 820 with regard to the person to whom an order will be given among the people in charge of areas, through the map UI 810 displayed on the screen of the user terminal apparatus 100, and drag or select the UI 830 for adding a conversation partner displayed on one side of the map UI 810 to the object 820. When the user command as described above is input, the user terminal apparatus 100 may add the person in charge with regard to the selected object as a conversation partner.

Thereafter, if an order voice related to a business order is input from the manager, the user terminal apparatus 100 may transmit an order voice of the manager to the user terminal apparatus 100 of the person in charge added as the conversation partner.

Hereinafter the operation that the user terminal apparatus 100 provides an event environment in which an utterance authority for transmitting a user voice to other user terminal apparatuses 100 that belongs to the same group with the user terminal apparatus 100 will be described in detail.

Figure 9:
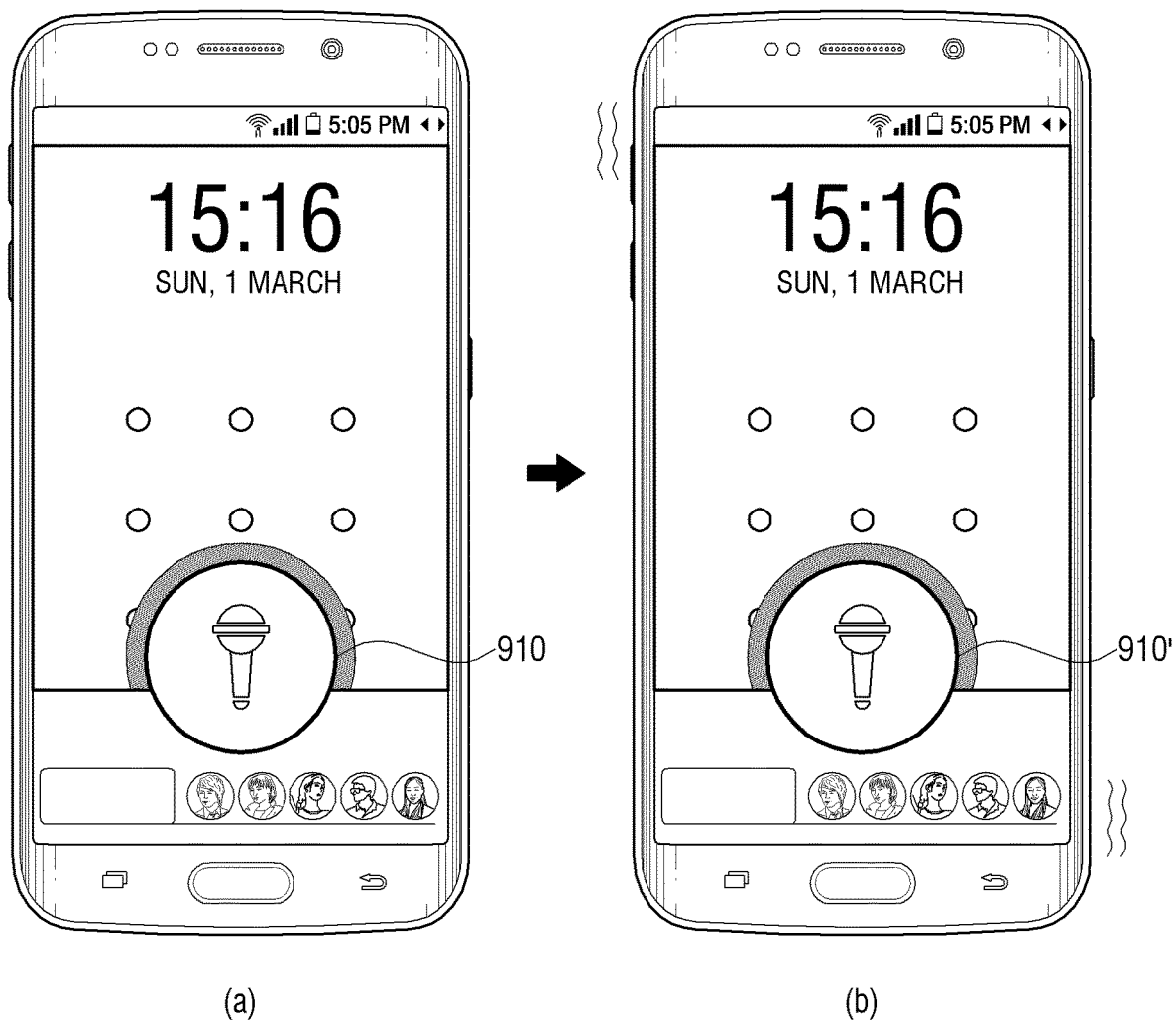
FIG. 9 is a first exemplary diagram providing a service informing of utterance possible status with regard to an order voice in a user terminal apparatus according to an embodiment.

FIG. 9 is a first exemplary diagram providing a service informing of utterance possible status with regard to an order voice in a user terminal apparatus according to an embodiment.

As illustrated in (a) of FIG. 9, the user terminal apparatus 100 may receive voice data with regard to an order voice from another user terminal apparatus 100 set as the same group with the user terminal apparatus 100. The voice data with regard to the order voice is received, the user terminal apparatus 100 may output a voice message with regard to the order voice. Accordingly, the user may confirm the voice message output through the user terminal apparatus 100 and select an utterance authority request UI 910 displayed on the user terminal apparatus 100 in order to transmit a response message with regard to the corresponding voice message to another user terminal apparatus 100.

When a selection command with regard to the utterance authority request UI 910 is input, the user terminal apparatus 100 transmits an utterance authority request message to the other user terminal apparatus 100 that transmitted the order voice. Accordingly, the other user terminal apparatus 100 determines an order to grant the utterance authority based on the order that the utterance authority request message is received from the user terminal apparatus 100 set as the same group with the other user terminal apparatus 100.

Thereafter, the other user terminal apparatus 100 may transmit a notification message according to the utterance authority setting to the user terminal apparatus 100 set as the same group with the other user terminal apparatus 100 based on the determined utterance authority order.

Accordingly, if the notification message according to the utterance authority setting is received from the other user terminal apparatus 100, the user terminal apparatus 100 may transmit the user voice related to the response message regarding the order voice to the other user terminal apparatus 100.

Here, if the notification message according to the utterance authority setting is received from the other user terminal apparatus 100, the user terminal apparatus 100 may inform that the utterance authority has been assigned to the user through a vibration feedback as illustrated in (b) of FIG. 9. Accordingly, the user may confirm that the utterance authority has been assigned through the vibration feedback, select the utterance authority request UI 910' displayed on the screen of the user terminal apparatus 100, and then input the user voice regarding the response message with regard to the order voice.

Accordingly, if a user voice related to the response message regarding the order voice is input after the selection command on the utterance authority request UI 910' is input, the user terminal apparatus 100 may transmit input user voice to the other user terminal apparatus 100.

Figure 10:
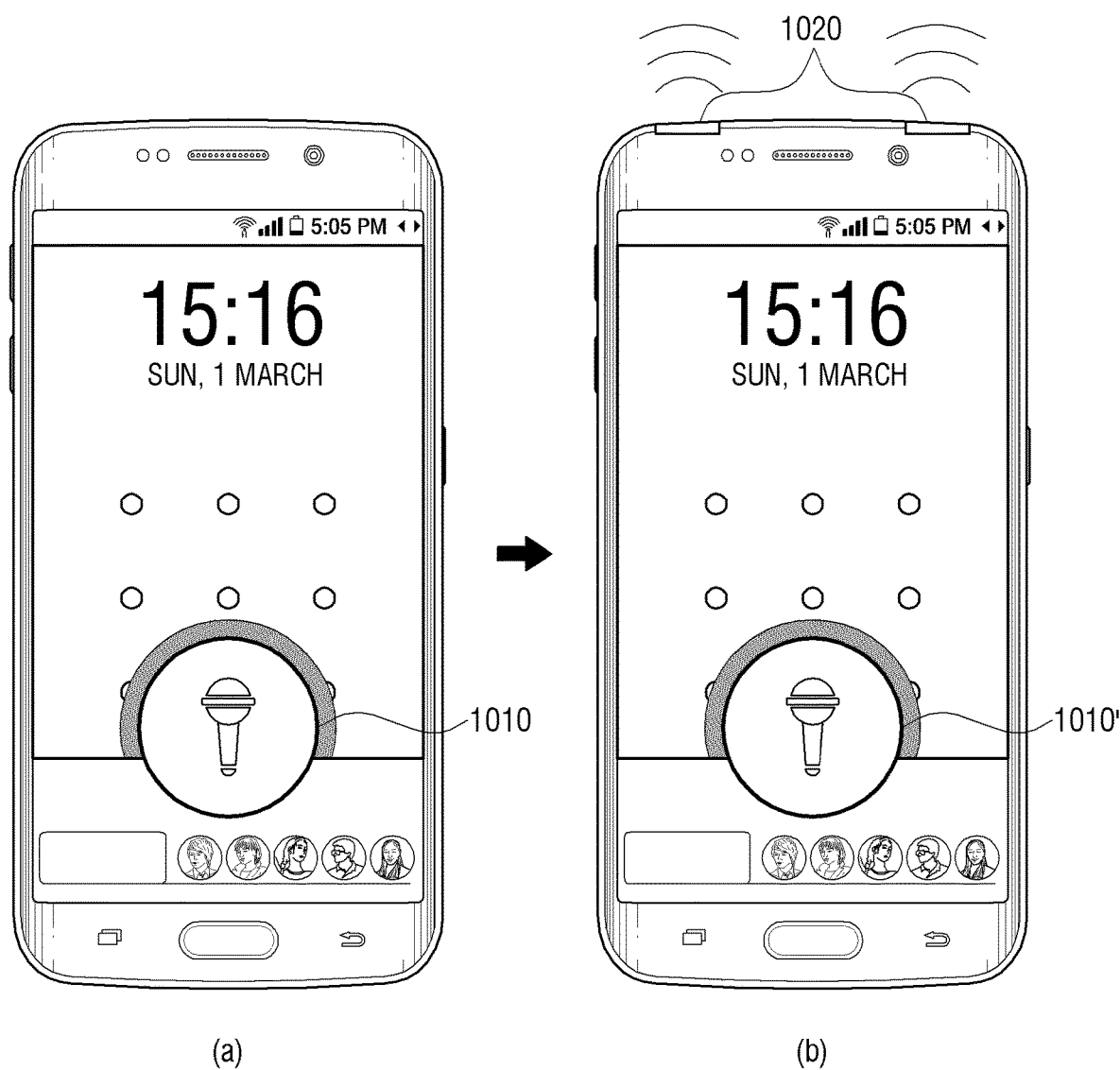
FIG. 10 is a second exemplary diagram providing a service informing of utterance possible status with regard to an order voice in a user terminal apparatus according to an embodiment.

FIG. 10 is a second exemplary diagram providing a service informing of utterance possible status with regard to an order voice in a user terminal apparatus according to an embodiment.

As illustrated in FIG. 1-(a), if a selection command regarding the utterance authority request UI 1010 is input after the voice data on the order voice is received from the other user terminal apparatus 100 set as the same group with the user terminal apparatus 100, the user terminal apparatus 100 transmits an utterance authority request message to the other user terminal apparatus 100 that transmitted the order voice.

Thereafter, if a notification message according to the utterance authority setting is received from the other user terminal apparatus 100, a notification which informs that the utterance authority has been assigned to the user may be provided through an even informing feedback. That is, if the notification message according to the utterance authority setting is received from the other user terminal apparatus 100, the user terminal apparatus 100 may inform that the utterance authority has been assigned to the user by providing an event informing feedback in a voice through a speaker 1020.

Accordingly, the user may confirm that the utterance authority has been assigned through the event notification feedback, select the utterance authority request UI 1010' displayed on the screen of the user terminal apparatus 100, and input a user voice related to a response message regarding the order message.

Accordingly, if a user voice related to a response message with regard to an order voice is input after the selection command regarding the utterance authority request UI 1010' is input, the user terminal apparatus 100 may transmit the input user voice to the other user terminal apparatus 100.

Figure 11:
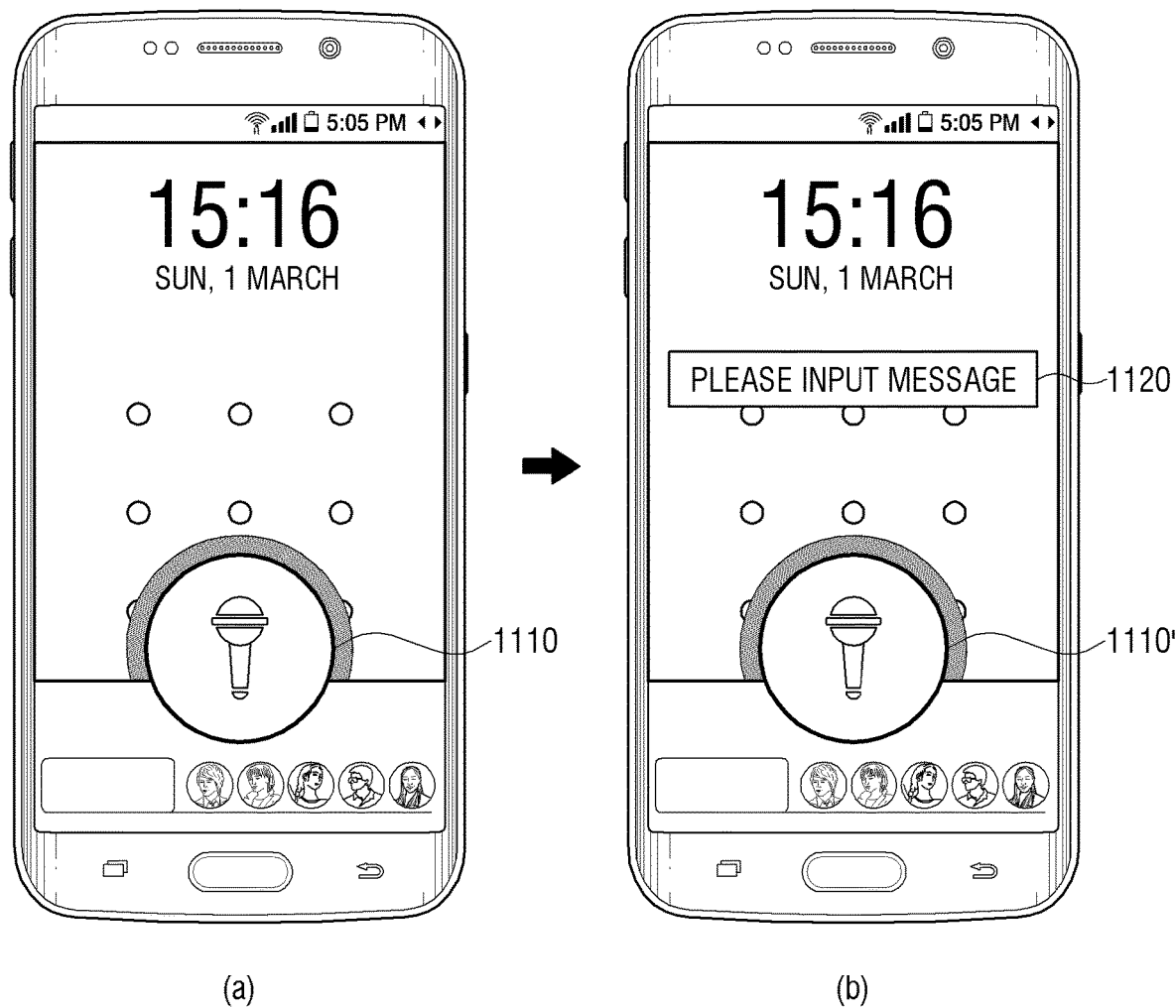
FIG. 11 is a third exemplary diagram providing a service informing of utterance possible status with regard to an order voice in a user terminal apparatus according to an embodiment.

FIG. 11 is a third exemplary diagram providing a service informing of utterance possible status with regard to an order voice in a user terminal apparatus according to another embodiment.

As illustrated in (a) of FIG. 11, if a selection command regarding the utterance authority request UI 1110 is input after voice data regarding the order voice is received from the other user terminal apparatus 100 set as the same group with the user terminal apparatus 100, the user terminal apparatus 100 transmits an utterance authority request message to the user terminal apparatus 100 that transmitted the order voice.

Thereafter, when a notification message according to an utterance authority setting is received from the other user terminal apparatus 100, a notification which informs that the utterance authority has been assigned may be provided through an event notification feedback. That is, if the notification message according to an utterance authority setting is received from the other user terminal apparatus 100, the user terminal apparatus 100 may inform that the utterance authority has been assigned by providing an event notification feedback 120 in a form of text such as 'Please input a message', as illustrated in (b) of FIG. 11.

Accordingly, the user may confirm that the utterance authority has been assigned through the event notification feedback, select the utterance authority request UI 1110' displayed on the screen of the user terminal apparatus 100, and input a user voice related to a response message regarding the order message.

Accordingly, if a user voice related to a response message with regard to an order voice is input after the selection command regarding the utterance authority request UI 1110' is input, the user terminal apparatus 100 may transmit the input user voice to the other user terminal apparatus 100.

Figure 12:
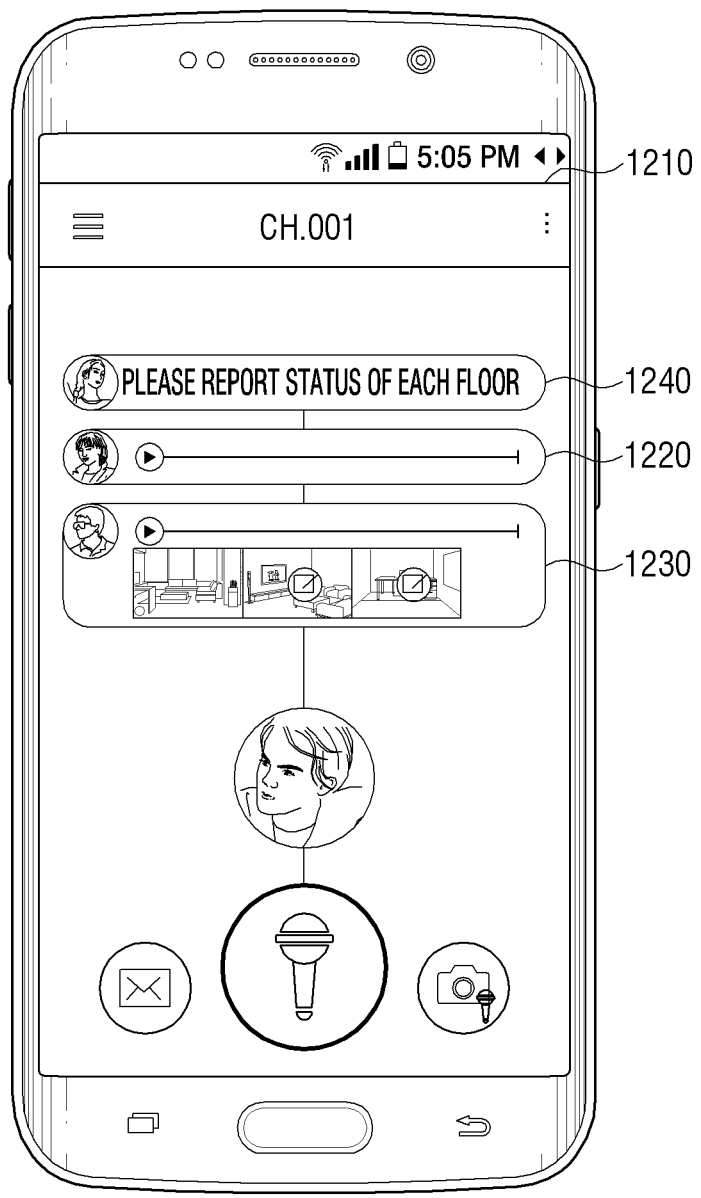
FIG. 12 is an exemplary diagram illustrating a display of an output UI in a user terminal apparatus according to an embodiment.

FIG. 12 is an exemplary diagram illustrating a display of an output UI in a user terminal apparatus according to an embodiment.

The manager who manages an entire building may transmit an order voice 'Please report the status of each floor' to the person in charge of each floor through the user terminal apparatus 100. Accordingly, the people in charge of each floor may transmit the user voice regarding the current status of each floor to the user terminal apparatus 100 of the manager who transmitted the order voice through their own user terminal apparatus 100. In addition, the people in charge of each floor may photograph a video image of each floor they are managing through their own user terminal apparatus 100, and transmit the photographed video image and the user voice to the user terminal apparatus 100 of the manager who transmitted the order voice.

When such user voice is received, the user terminal apparatus 100 may display an output UI 1210 which includes execution icons 1220 and 1230 for executing the voice message corresponding to the user voice of each person in charge, as illustrated in FIG. 12. Here, the execution icons 1220 and 1230 of the voice message may be arranged in the order that the user voices are received.

Additionally, the user terminal apparatus 100 may display the voice message 1240 with regard to the order voice 'Please report the status of each floor' on the output UI 1210.

In addition, if the user voice is received together with the video voice, the user terminal apparatus 100 may display the output UI 1210 which includes an execution icon 1230 with includes a thumbnail image regarding the video image and a voice message corresponding to the user voice.

Accordingly, the manager may select at least one of the plurality of execution icons 1220 and 1230 included in the output UI 1210 displayed on the screen of the user terminal apparatus 100, and confirm at least one of a user voice and a video image corresponding to the selected execution icon so as to confirm the current status of each floor.

In the above, the configurations and operations of the user terminal apparatus 100 for performing a group communication according to an embodiment have been described in detail. Hereinafter a method for controlling the user terminal apparatus 100 according to an embodiment will be described in detail.

Figure 13:
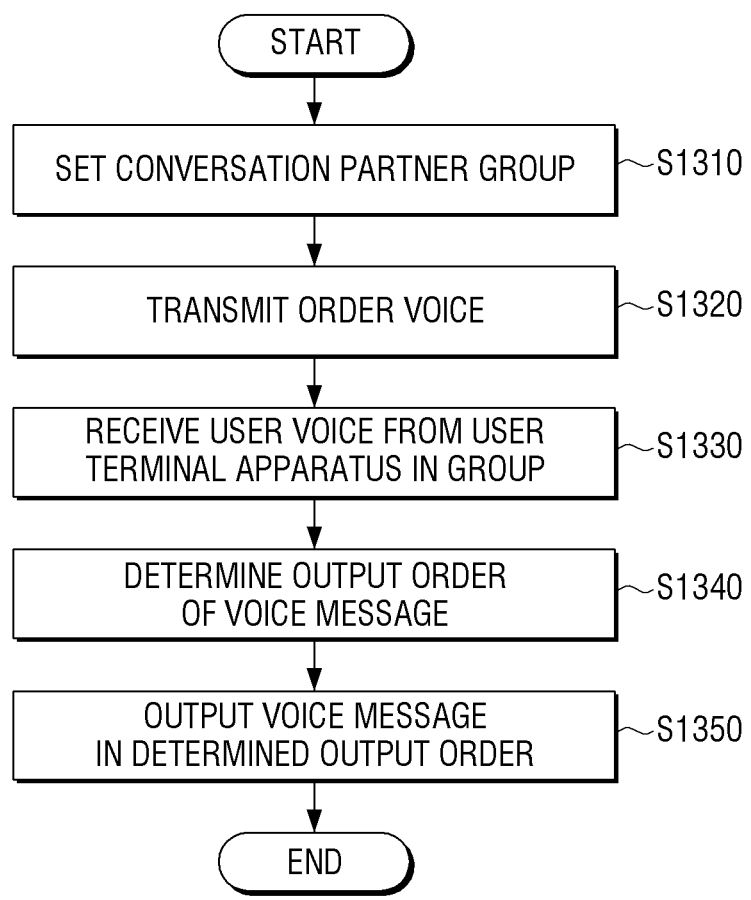
FIG. 13 is a flow chart illustrating a controlling method of a group communication in a user terminal apparatus with another user terminal apparatus according to an embodiment.

FIG. 13 is a flow chart illustrating a control method for performing a group communication with another user terminal apparatus in a user terminal apparatus according to an embodiment.

As illustrated in FIG. 13, the user terminal apparatus 100 sets a conversation partner group for performing a group communication with the user terminal apparatus 100 in S1310. Specifically, the user terminal apparatus 100 may display a channel list UI for each group set as a group with the user terminal apparatus 100, and when one of the object for each group included in the displayed channel list UI is selected, set the group corresponding to the selected object as a conversation partner group.

When the conversation partner group is set, the user terminal apparatus 100 transmits an order voice of a user to a plurality of user terminal apparatuses 100 (hereinafter referred to as other user terminal apparatuses) included in the conversation partner group in S1320. When the user voice related to a response message regarding the order voice is received from the other user terminal apparatuses 100 which receives an order voice, the user terminal apparatus 100 determines an output order of the voice message corresponding to the received user voice in S1330 and S1340.

According to an embodiment, if the user voice is received from the plurality of other user terminal apparatuses 100, the user terminal apparatus 100 may determine an output order of the voice message corresponding to the user voice based on the order that a user voice is received.

According to another embodiment, the user terminal apparatus 100 may determine an output order of a voice message corresponding to the user voice received from the plurality of other user terminal apparatuses 100 based on the order that an utterance request message is received from the plurality of other user terminal apparatuses 100.

According to another embodiment, the user terminal apparatus 100 may analyze the similarity of a voice message corresponding to a user voice received from the plurality of other user terminal apparatuses 100, and determine an output order in the order of a voice message of which similarity is different.

If the output order regarding the user voice received from the plurality of other user terminal apparatuses 100 is determined through the above various embodiments, the user terminal apparatus 100 may output a response message corresponding to a user voice according to an output order.

Meanwhile, if the user voice is received from the plurality of other user terminal apparatuses 100 in the stage S1330, the user terminal apparatus 100 may display reception status information regarding the user voice received from the other user terminal apparatuses 100 on the object of the group set as a conversation partner group among the objects for each group included in the channel list UI.

Accordingly, the user terminal apparatus 100 may grasp the reception status of the response message regarding an order voice from the user of the other user terminal apparatuses 100 based on the reception status information displayed on the object for each group included in the channel list UI.

FIG. 14 is a flow chart illustrating a method that in a user terminal apparatus, the same group as the user terminal apparatus transmits a user voice to another user terminal apparatus according to an embodiment.

As illustrated in FIG. 14, if an order voice is received from the first user terminal apparatus 100-1 among a plurality of user terminal apparatuses belong to the same group with the user terminal apparatus 100, the user terminal apparatus 100 transmits an utterance request message to the first user terminal apparatus 100-1 in S1410 and S1420.

Thereafter, if an utterance authority is set from the first user terminal apparatus 100-1, the user terminal apparatus 100 transmits a user voice with regard to an order voice to the first user terminal apparatus 100-1 in S1430.

Specifically, when an order voice is received from the first user terminal apparatus 100-1, the user terminal apparatus 100 outputs a voice message regarding the received order voice. If a user command for an utterance request is input from a user after the voice message regarding the order voice is output, the user terminal apparatus 100 transmits an utterance request message to the first user terminal apparatus 100-1.

Accordingly, the first user terminal apparatus 100-1 sets an utterance authority based on the utterance request message received from a plurality of other user terminal apparatuses 100 belong to the same group as the first user terminal apparatus 100-1.

When the utterance authority is set, the first user terminal apparatus 100-1 transmits a notification message according to the utterance authority setting to the other user terminal apparatus 100 which belong to the same group as the first user terminal apparatus 100-1 based on the order according to the set utterance authority.

Accordingly, when the notification message according to the utterance authority setting is received from the first user terminal apparatus 100-1, the user terminal apparatus 100 provides a service informing an utterance possible status regarding the order voice based on at least one of a vibration feedback and an event notification feedback. Accordingly, a user confirms that the utterance authority has been assigned through the above notification service, and transmit a response message regarding the order voice to the user of the first user terminal apparatus 100 through the user terminal apparatus 100.

Meanwhile, the method for controlling the user terminal apparatus according to the above described various embodiments may be coded into the software and stored in non-transitory readable recording medium. The non-transitory readable medium may be installed and used in various devices.

The non-transitory computer readable medium is not a medium that stores data for a short moment such as a register, a cash and a memory and the like, but a medium that stores data semi-permanently and which is readable by an apparatus. For example, the non-transitory apparatus-readable medium may include a compact disc (CD), a digital versatile disc (DVD), a hard disc, a Blu-ray disc, a memory card, or a read only memory (ROM).

Also, the description of the embodiments is intended to be illustrative, and not to limit the scope of the claims, and it would be appreciated by those skilled in the art that changes may be made to the embodiments without departing from the principles and spirit of the disclosure, the scope of which is defined in the appended claims.

The invention claimed is:

1. A user terminal apparatus comprising:
   a transceiver configured to perform data communication with a plurality of other user terminal apparatuses set as a group;
   a processor configured to, based on a user voice being received from the plurality of other user terminal apparatuses, determine an output order of a voice message corresponding to the user voice according to a predetermined condition; and an output device configured to output the voice message in the determined output order, wherein the processor is further configured to:

based on receiving messages requesting for an utterance authority from a first other user terminal apparatus and a second other user terminal apparatus among the plurality of other user terminal apparatuses respectively, set an order of utterances for the first other user terminal apparatus and a second other user terminal apparatus, transmit a message, to the first other user terminal apparatus, requesting a voice message based on the order of the utterances, and based on receiving the voice message from the first other user terminal apparatus, transmit a message, to the second other user terminal apparatus requesting a voice message based on the order of the utterances.

2. The user terminal apparatus as claimed in claim 1, wherein the processor is further configured to, based on the user voice being received from the plurality of other user terminal apparatuses, determine the output order of the voice message corresponding to the user voice based on an order of receipt of the user voice.

3. The user terminal apparatus as claimed in claim 1, wherein the processor is further configured to determine the output order of the voice message corresponding to the user voice received from the plurality of other user terminal apparatuses based on an order that an utterance request message is received from the plurality of other user terminal apparatuses.

4. The user terminal apparatus as claimed in claim 1, wherein the processor is further configured to analyze similarity of the voice message corresponding to the user voice received from the plurality of other user terminal apparatuses, and determine the output order in an order of a voice message of which similarity is different.

5. The user terminal apparatus as claimed in claim 1,
wherein the output device comprises a display and an audio output device, and
wherein the processor is further configured to:
control the display to display an output user interface (UI) which includes an execution icon regarding the voice message, and
in response to a selection command on an execution icon included in the output user interface (UI) being input, control at least one of the display or the audio output device to output a voice message corresponding to the selection command.

6. The user terminal apparatus as claimed in claim 1,
wherein the output device comprises a display which displays a channel list user interface (UI) for each group, and
wherein the processor is further configured to, in response to one of objects for each group included in the channel list user interface (UI) being selected, select a group corresponding to the selected object as a conversation partner group and transmit an order voice to a plurality of user terminal apparatuses included in the conversation partner group.

7. The user terminal apparatus as claimed in claim 6, wherein the processor is further configured to control the display to display reception status information on the user voice received from other user terminal apparatuses for each group on an object of each group included in the channel list user interface (UI).

8. The user terminal apparatus as claimed in claim 6, wherein the order voice comprises a voice message transmitted from the user terminal apparatus which requests a response from the plurality of user terminal apparatuses included in the conversation partner group.

9. The user terminal apparatus as claimed in claim 1, wherein the processor is further configured to:
transmit an order voice message to the plurality of other user terminal apparatuses,
receive an utterance request message from the first other user terminal apparatus, and
in response to the utterance authority being set for the first other user terminal apparatus, receive the voice message with regard to the order voice message from the first other user terminal apparatus.

10. The user terminal apparatus as claimed in claim 9, wherein the message transmitted to the first other user terminal apparatus comprises at least one of a vibration feedback or an event notification feedback.

11. The user terminal apparatus as claimed in claim 1, wherein the utterance authority permits a user of the user terminal apparatus receiving the utterance authority to transmit a voice message.

12. A controlling method of a user terminal apparatus comprising:
receiving a user voice from a plurality of other user terminal apparatuses;
determining an output order of a voice message corresponding to the user voice according to a predetermined condition; and
outputting the voice message in the determined output order,
wherein the controlling method further comprises:
based on receiving messages requesting for an utterance authority from a first other user terminal apparatus and a second other user terminal apparatus among the plurality of other user terminal apparatuses respectively, setting an order of utterances for the first other user terminal apparatus and a second other user terminal apparatus,
transmitting a message, to the first other user terminal apparatus, requesting a voice message based on the order of the utterances, and
based on receiving the voice message from the first other user terminal apparatus, transmitting a message, to the second other user terminal apparatus requesting a voice message based on the order of the utterances.

13. The controlling method as claimed in claim 12, wherein the determining comprises, based on the user voice being received from the plurality of other user terminal apparatuses, determining the output order of the voice message corresponding to the user voice based on an order of receipt of the user voice.

14. The controlling method as claimed in claim 12, wherein the determining comprises determining the output order of the voice message corresponding to the user voice received from the plurality of other user terminal apparatuses based on an order that an utterance request message is received from the plurality of other user terminal apparatuses.

15. The controlling method as claimed in claim 12, wherein the determining comprises analyzing similarity of the voice message corresponding to the user voice received from the plurality of other user terminal apparatuses, and determining the output order in an order of a voice message of which similarity is different.

16. The controlling method as claimed in claim 12, wherein the outputting comprises displaying an output user interface (UI) which includes an execution icon regarding the voice message and in response to a selection command on an execution icon included in the output user interface (UI), outputting a voice message corresponding to the selection command as at least one of a text or an audio signal.

17. The controlling method as claimed in claim 12, further comprising:
- displaying a channel list user interface (UI) for each group;
- in response to one of objects for each group included in the channel list user interface (UI) being selected, setting a group corresponding to the selected object as a conversation partner group; and
- transmitting an order voice to a plurality of other user terminal apparatuses included in the conversation partner group.

* * * * *